United States Patent [19]

Marts et al.

[11] Patent Number: 4,666,125
[45] Date of Patent: May 19, 1987

[54] LOW LEAKAGE SOLENOID VALVE

[75] Inventors: Maynard W. Marts; Michael F. Mendoza, both of Hutchinson, Kans.

[73] Assignee: The Cessna Aircraft Company, Wichita, Kans.

[21] Appl. No.: 829,621

[22] Filed: Feb. 14, 1986

[51] Int. Cl.⁴ .......................... F16K 31/06; F16K 1/42
[52] U.S. Cl. .......................... 251/129.19; 251/129.15; 251/362; 251/358
[58] Field of Search .................. 251/361, 360, 129.15, 251/129.19, 362, 358

[56] References Cited

U.S. PATENT DOCUMENTS 3,107,893 10/1963 Bashe .......................... 251/129.19 X
3,510,103 5/1970 Carsello .......................... 251/361 X

FOREIGN PATENT DOCUMENTS 73678 4/1984 Japan .......................... 251/129.15

Primary Examiner—Arnold Rosenthal
Attorney, Agent, or Firm—Edward L. Brown, Jr.

[57] ABSTRACT

A normally closed high pressure solenoid valve structure including a plunger pin spring-urged against a composite valve seat having a steel reinforcing ring positioned against the seat and backed up by a fixed spacer. The seat has a projecting neck with orifice. The steel reinforcing ring surrounds and contains any radial movement of the seat which is of elastic material softer than the plunger pin which provides a very low leakage level across the valve from either direction. A lost-motion connection between the plunger pin and the solenoid armature provides that the spring load on the plunger pin is retained even with cold flow of the seating material during cycling.

12 Claims, 2 Drawing Figures

LOW LEAKAGE SOLENOID VALVE

BACKGROUND OF THE INVENTION

The invention relates to solenoid valve construction and more particularly to a low leakage pin and seat configuration used in hydraulic systems of up to 3000 PSI whereby two distinct materials are utilized in the seat member.

Conventionally normally closed solenoid valves, such as shown in U.S. Pat. No. 3,737,141 are of the type which pull a spring-biased plunger pin, having a tapered end, off a seat. Normally, the pin and seat are made of steel, and the leakage rate across the seat in the closed position is sometimes undesirable in certain applications.

SUMMARY OF THE INVENTION

Rather than a conventional seat member constructed of steel or various other metals, the composite seat of the present invention is made of an elastic non-metallic material with a steel reinforcing ring surrounding the neck portion of the seat. An elastic material such as nylon or glass-filled nylon, with a steel ring around its neck provides sufficient strength against radial deformation of the seat when engaged by the tapered plunger pin. Due to the required spring force on the plunger pin to maintain the valve in its closed position, there is substantial pressure on the contact surface of the seat which in the absence of the reinforcing ring would fail very quickly. The reinforcing ring not only allows the elastic seat material to hold up under high pressure, but also does not introduce a new leakage path around the seat for the oil to pass. The seat member is substantially surrounded by the valve body while the reinforcing ring rigidly holds the seat member in place through a spacer member. The spacer member also guides the plunger pin in its axial movement so that it has proper alignment as it contacts the seat member. The radial movement of the plunger pin is limited during cycling by guiding the plunger pin travel with a controlled clearance between the plunger pin and the spacer bore. The plunger pin is connected to the armature member through a lost-motion connection which allows a slight overtravel of the plunger pin. In a situation where there is slight cold flowing of the seat material the tapered end of the plunger pin will seat in a deeper position. Due to the lost-motion connection, the spring force holding the valve closed is always maintained even with a deeper seated pin position.

It is therefore the principal object of the present invention to provide a normally closed high pressure solenoid type valve having low leakage characteristics.

It is another object of the present invention to provide a solenoid valve construction having a seat member constructed of composite parts including an elastic material at the contact surface of the seat surrounded by a reinforcing ring.

A further object of the present invention is to provide an improved high pressure solenoid valve construction which can be pressurized from opposite sides.

Other objects and advantages of the present invention are described in or will become apparent from the following detailed description and accompanying drawings of the preferred embodiment.

DETAILED DESCRIPTION OF THE PREFERRED EMBODIMENT

Figure 1:
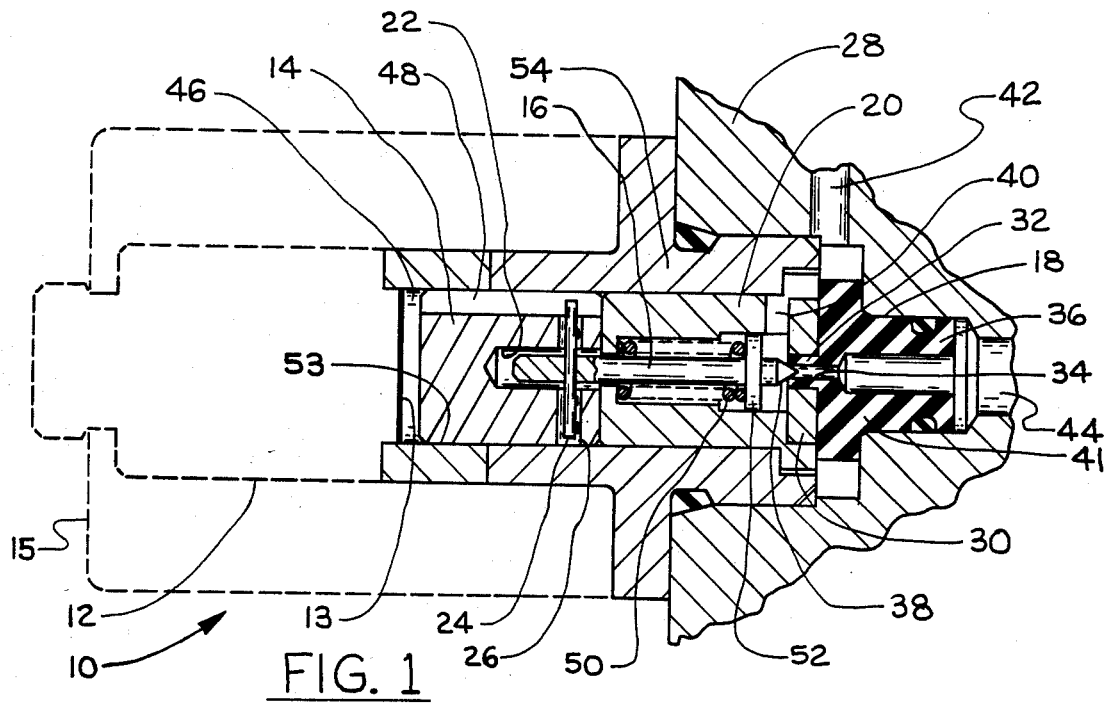
FIG. 1 is a longitudinal sectional view through the solenoid valve in the fully de-energized closed position with the solenoid coil and fixed core shown symbolically in dotted line.

FIG. 1 illustrates a normally closed solenoid valve in the de-energized position generally described by reference numeral 10. Valve 10 comprises a solenoid coil 15 and fixed core 12 symbolically shown since they are conventional in design and well known in the prior art as illustrated in U.S. Pat. No. 4,524,947. The fixed core 12 of the solenoid has a pole face 13 which attracts armature member 14 across an air cavity 46 when the solenoid coil 15 is energized. The armature member 14 is slidably positioned in a bore 53 within the solenoid core body 54 which is part of the fixed core. Core body 54 is in turn threadably received within the directional control valve body 28 or another component of the hydraulic system in a conventional manner. Valve 10 controls the flow between passage 42 and concentric passage 44 with the high pressure side being in either passage. Spring member 50 urges the slidable plunger pin 16 in a closed position against the reduced diameter neck portion 32 of the seat member 18. Plunger pin 16 has a conical face 38 which enters a concentric neck passage 34 and contacts an annular surface on the neck portion 32 of the seat. The pin is guided radially, in the FIG. 1 configuration, by flange 52 sliding within a bore in spacer member 20. Plunger pin 16 is connected to the armature member 14 of the solenoid through a guide bore 22 and a lateral pin 24 which passes through the plunger pin 16 and a lateral loose-fitting opening 26 in the armature 14. With the solenoid 12 de-energized, armature 14 is limited in its rightward movement by spacer member 20 fixed within the core body 54. Centrally located within spacer 20 is a longitudinal bore enlarged at its right end and connected with a pair of radial slots 40 so as to connect with lateral passage 42.

Seat member 18 is constructed of an elastic high strength material such as glass-filled Nylon and includes a boss portion 36 joining with a flange 41 which in turn has a reduced diameter thin wall neck portion 32 extending therefrom. Neck 32 includes a concentric passage 34 therethrough with a steel reinforcing ring 30 surrounding the neck. The right end of spacer member 20 includes a cavity (not shown) for receipt of reinforcing ring 30 which positions ring 30 against the flanged end of seat member 18, thus preventing any movement or deformation of seat member 18 in a leftward direction due to pressure in passage 44. The concentric neck passage 34 through the seat member 18 can function as a pilot orifice in the overall hydraulic system since a very small flow rate can actually pass through passage 34. The spring load on plunger pin 16 is transmitted through flange 52 on pin 16. A slot 48 allows pressure to equalize between the pole face 13 and the cavity surrounding right end of the plunger pin 16.

Figure 2:
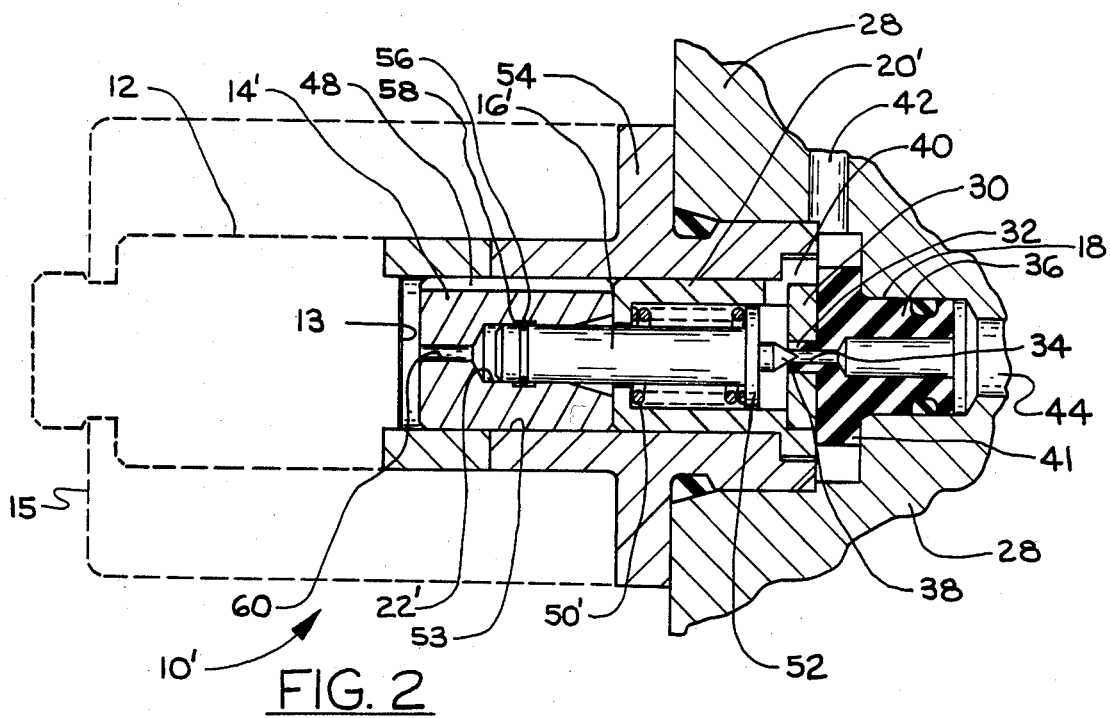
FIG. 2 is a similar view to FIG. 1 of a modified form of the present invention.

FIG. 2 is similar to FIG. 1 except for a different type of lost-motion connection between armature 14' and plunger pin 16'. Armature 14' includes a larger diameter guide bore 22' having an annular groove 58 cut therein. Positioned on the left end of plunger pin 16' is a snap ring 56 seated in a shallow groove and extending into annular groove 58 thereby allowing lost motion between the pin 16' and armature 14'. Axially positioned at the left end of armature 14' is a vent passage 60 which functions with slot 48 to allow the pressure to equalize between the pole face 13 and the cavity surrounding the right end of plunger pin 16'. The spacer member 20' includes a bore for receipt of flange 52 which provides the radial alignment for pin 16' as it engages seat member 18. With this radial alignment, the probability of the plunger pin 16' returning to the same position after each cycle is increased, which in turn increases the life of the seat member 18.

OPERATION

With solenoid coil 15 de-energized, as illustrated in FIG. 1, and high pressure in passage 44, the solenoid valve 10 is held closed, blocking all flow into passage 42 by the compressive force of spring 50 acting on pin 16. This spring force is substantial since it is acting directly against the high pressure in passage 44 acting on the end area of pin 16 exposed to pressure in passage 34. In its closed position as illustrated, the valve 10 provides a leakage rate across the seat of less than one drop per minute.

The solenoid valve 10 will also function with the high pressure being in the opposite chamber 42 and 40 while passage 44 is connected to drain. Due to the spring force on plunger pin 16 acting against the annular contact surface of seat 18, there is a slight cold flowing of the seat material.

Once voltage is applied to the solenoid coil 15, the electro-magnetic force on armature 14 overcomes the spring load on pin 16 and the pin is pulled toward the pole face 13 of the solenoid. The conical face 38 of the plunger pin is then lifted off of neck portion 32 of the seat allowing flow through passage 34. When voltage is de-energized from solenoid coil 15, the spring 50 returns plunger pin 16 to a seated position in the neck portion 32 of the seat. Lateral or radial movement of the plunger pin 16 is limited during cycling of the valve 10 by the controlled clearance between plunger pin flange 52 and the bore of spacer member 20. This guiding is beneficial to the life of the seat member 18 since it has a tendency not to enlarge the contact surface area of neck portion 32 after prolonged cycling.

Due to the lost-motion connection between armature 14 and plunger pin 16, pin 16 is allowed to take a deeper seated position while armature 14 does not move. This allowed overtravel of pin 16 permits a constant spring closing force on the pin even though there is a slight cold flowing of the annular contact surface of seat 18.

Having described the invention with sufficient clarity to enable those familiar with the art co construct and use the invention, we claim:

1. In a solenoid high pressure valve structure including a conventional coil, fixed core and armature, the improvement comprising a valve structure including:
   a body having a bore therein;
   a slidable plunger pin attached to the armature positioned in the bore, the pin having a conical face for sealing engagement with a seat;
   a non-metallic seat member positioned in the bore with a concentric passage therethrough including a reduced diameter neck portion with an annular contact surface thereon;
   a reinforcing ring means positioned against the seat member and surrounding the neck portion to contain any radial deformation or axial movement of the seat member;
   biasing means in the bore urging the conical face of the plunger pin against the contact surface of the seat member in a high pressure sealing relationship;
   a spacer member, fixed in the bore, located between the reinforcing ring and the armature and positioned against the reinforcing ring which in turn is positioned against the seat member.

2. In a solenoid valve as set forth in claim 1, wherein the seat member is an elastic material having a hardness less than that of the plunger pin.

3. In a solenoid valve as set forth in claim 1, wherein the seat member is Nylon having a hardness less than that of the plunger pin.

4. In a solenoid valve as set forth in claim 1, including a spacer means in the bore limiting the armature movement away from the fixed core, a lost-motion connection means between the armature and the slidable plunger pin whereby the plunger pin continues to carry its spring load after axial displacement of the plunger pin due to cold flow of the seat member at the contact surface.

5. In a solenoid valve as set forth in claim 4, wherein the lost-motion connection means comprises a lateral pin passing through the plunger pin and an oversized lateral opening in the armature.

6. In a solenoid valve as set forth in claim 4, wherein the lost-motion connection means comprises a guide bore in the armature with an annular groove therein, a locking ring fixedly attached to the plunger pin and loosely positioned within said annular groove.

7. In a solenoid valve as set forth in claim 1, wherein the reduced diameter neck portion has a wall thickness less than the diameter of the concentric passage.

8. In a solenoid valve as set forth in claim 1, wherein the seat member is nylon having a hardness less than that of the plunger pin, including a lost-motion means between the armature and the plunger pin, a reduced diameter neck portion having a wall thickness of less than the diameter of the concentric passage, the seat member having an outwardly extending flange from said bore which prevents any axial movement of the seat member in the bore.

9. In a solenoid valve as set forth in claim 1, wherein the seat member includes a flange extending outside the bore.

10. In a solenoid valve as set forth in claim 1, wherein the biasing means is sufficiently strong to hold the plunger pin closed with hight pressure in the concentric passage side of the valve.

11. In a solenoid valve as set forth in claim 1 wherein the seat member is glass-filled nylon.

12. In a solenoid valve as set forth in claim 1 wherein the fixed spacer supports the biasing means and a guiding means which accurately directs the plunger pin into the seat.

* * * * *